(12) United States Patent
Asterjadhi et al.

(10) Patent No.: US 9,955,502 B2
(45) Date of Patent: Apr. 24, 2018

(54) EDCA PARAMETER SET DIFFERENTIATION FOR DIFFERENT DEVICE TYPES

(71) Applicant: QUALCOMM Incorporated, San Diego, CA (US)

(72) Inventors: Alfred Asterjadhi, San Diego, CA (US); Amin Jafarian, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/701,503

(22) Filed: Apr. 30, 2015

(65) Prior Publication Data
US 2015/0319609 A1 Nov. 5, 2015

(51) Int. Cl.
*H04W 74/00* (2009.01)
*H04W 8/22* (2009.01)
*H04W 74/08* (2009.01)
*H04W 28/18* (2009.01)
*H04W 84/18* (2009.01)

(52) U.S. Cl.
CPC .......... *H04W 74/006* (2013.01); *H04W 8/22* (2013.01); *H04W 28/18* (2013.01); *H04W 74/08* (2013.01); *H04W 84/18* (2013.01)

(58) Field of Classification Search
CPC .................................................. H04W 74/006
See application file for complete search history.

(56) References Cited

U.S. PATENT DOCUMENTS

| | | | | |
|---|---|---|---|---|
| 2011/0222520 A1* | 9/2011 | Montemurro | ....... | H04W 74/006 370/338 |
| 2012/0099497 A1* | 4/2012 | Vaidya | .................. | G06F 1/3203 370/311 |
| 2013/0077608 A1* | 3/2013 | Amini | ................... | H04L 1/0041 370/337 |
| 2013/0176902 A1 | 7/2013 | Wentink et al. | | |
| 2013/0294354 A1* | 11/2013 | Zhang | .................. | H04W 72/04 370/329 |
| 2014/0153463 A1* | 6/2014 | Park | .................. | H04W 52/0216 370/311 |

OTHER PUBLICATIONS

International Search Report and Written Opinion—PCT/US2015/028771—ISA/EPO—dated Aug. 10, 2015.

(Continued)

*Primary Examiner* — Brian D Nguyen
*Assistant Examiner* — Toan Nguyen
(74) *Attorney, Agent, or Firm* — Patterson & Sheridan, LLP

(57) ABSTRACT

Certain aspects of the present disclosure provide methods and apparatus for signaling enhanced distributed channel access (EDCA) parameter sets, with support for different device types. The apparatus typically includes a processing system configured to generate a frame with an indication of a type of device that is to use a particular enhanced distribution channel access (EDCA) parameter set and an interface for outputting a frame containing the TIM IE for transmission.

24 Claims, 9 Drawing Sheets

(56) References Cited

OTHER PUBLICATIONS

Jafarian A., et al., "EDCA Parameters", Jul. 1, 2012, Jul. 16, 2012 (Jul. 16, 2012), p. 10pp, XP007923172, Retrieved from the Internet: URL:https://mentor.ieee.org/802.11/dcn/12/11-12-0061-00-00ah-edca-parameters-for-11ah.pptx [retrieved on Jul. 8, 2015] slide 4-slide 8.
Park M., et al., "802.11ah channel access improvement, 11-11-1230-01-00ah-802-11ah-channel-access-improvement", IEEE SA Mentor; 11-11-1230-01-00AH-802-11AH-Channel-Access-Improvement, IEEE-SA Mentor, Piscataway, NJ USA, vol. 802.11ah, No. 1, May 14, 2012 (May 14, 2012), pp. 1-11, XP068037356, [retrieved on May 14, 2012] slide 6, slide 9.

\* cited by examiner

| AC | CWmin | CWmax | AIFSN |
|---|---|---|---|
| AC_BK | aCWmin | aCWmax | 7 |
| AC_BE | aCWmin | aCWmax | 3 |
| AC_VI | (aCWmin+1)/2-1 | aCWmin | 2 |
| AC_VO | (aCWmin+1)/4-1 | (aCWmin+1)/2-1 | 2 |

| AC | CWmin | CWmax | AIFSN | TXOP limit | |
|---|---|---|---|---|---|
| | | | | For PHYs defined in Clause 16 (DSSS PHY specification for 2.4 GHz band designated for ISM-applications) and Clause 17 (High rate direct sequence spread spectrum (HR/DSSS) PHY-specification) | For PHYs defined in Clause 18 (Orthogonal frequency division multiplexing (OFDM) PHY specification), Clause 19 (Extended Rate PHY (ERP) specification), Clause 20 (High Throughput (HT) PHY specification), Clause 22 (Very High Throughput (VHT) PHY specification and Clause 24 (Sub 1 GHz (S1G) PHY specification) | Other PHYs |
| AC_BK | aCWmin | aCWmax | 7 | 0 | 0 | 0 |
| AC_BE | aCWmin | aCWmax | 3 | 0 | 0 | 0 |
| AC_VI | (aCWmin+1)/2-1 | aCWmin | 2 | 6.016 ms | 3.008 ms | 0 |
| AC_VO | (aCWmin+1)/4-1 | (aCWmin+1)/2-1 | 2 | 3.264 ms | 1.504 ms | 0 |

FIG. 10A

| AC | CWmin | CWmax | AIFSN | TXOP limit |
|---|---|---|---|---|
| AC_BK | aCWmin | aCWmax | 7 | 0 ms |
| AC_BE | (aCWmin+1)/4-1 | aCWmin | 2 | 0 ms |
| AC_VI | (aCWmin+1)/2-1 | aCWmin | 5 | 3.008 ms |
| AC_VO | (aCWmin+1)/2-1 | aCWmin | 4 | 1.504 ms |

FIG. 10B

EDCA PARAMETER SET DIFFERENTIATION FOR DIFFERENT DEVICE TYPES

CLAIM OF PRIORITY UNDER 35 U.S.C. § 119

The present application for patent claims benefit of U.S. Provisional Patent Application Ser. No. 61/987,460, filed May 1, 2014 and U.S. Provisional Patent Application Ser. No. 61/990,565, filed May 8, 2014 and assigned to the assignee hereof and hereby expressly incorporated by reference herein.

BACKGROUND

Field of the Invention

Certain aspects of the present disclosure generally relate to wireless communications and, more particularly, to enhanced distributed channel access (EDCA) with support for device types.

Relevant Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various schemes are being developed. One such scheme is the sub-1-GHz (S1G) frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than other IEEE 802.11 groups and has lower obstruction losses.

SUMMARY

Certain aspects of the present disclosure provide an apparatus for wireless communications. The apparatus typically includes a processing system configured to generate a frame with an indication of a type of device that is to use a particular enhanced distribution channel access (EDCA) parameter set and an interface for outputting a frame containing the TIM IE for transmission.

Certain aspects of the present disclosure provide an apparatus for wireless communications. The apparatus typically includes an interface for receiving a frame with indication of a type of device that is to use a particular enhanced distributed channel access (EDCA) parameter set and a processing system configured to determine whether the apparatus should use the particular EDCA parameter set based on the indication.

Certain aspects of the present disclosure provide a method for wireless communications. The method typically includes generating, at an apparatus, a frame with an indication of a type of device that is to use a particular enhanced distributed channel access (EDCA) parameter set; and outputting the frame for transmission.

Certain aspects of the present disclosure provide a method for wireless communications. The method typically includes receiving, at an apparatus, a frame with an indication of a type of device that is to use a particular enhanced distributed channel access (EDCA) parameter set, and determining, whether to use the particular EDCA parameter set based on the indication.

Certain aspects of the present disclosure provide an apparatus for wireless communications. The apparatus typically includes means for generating a frame with an indication of a type of device that is to use a particular enhanced distributed channel access (EDCA) parameter set, and means for outputting the frame for transmission.

Certain aspects of the present disclosure provide an apparatus for wireless communications. The apparatus typically includes means for receiving a frame with an indication of a type of device that that is to use a particular enhanced distributed channel access (EDCA) parameter set and means for determining whether the apparatus should use the particular EDCA parameter set based on the indication.

Certain aspects of the present disclosure provide a computer program product for wireless communications. The computer program product typically includes a computer-readable medium having instructions for generating, at an apparatus, a frame with an indication of a type of device that that is to use a particular enhanced distributed channel access (EDCA) parameter set, and outputting the frame for transmission.

Certain aspects of the present disclosure provide a computer program product for wireless communications. The computer program product typically includes a computer-readable medium having instructions for receiving, at an apparatus, a frame with an indication of a type of device that that is to use a particular enhanced distributed channel access (EDCA) parameter set and determining, whether to use the particular EDCA parameter set based on the indication.

Certain aspects of the present disclosure provide an access point. The access point typically includes at least one antenna, a processing system configured to generate a frame with an indication of a type of device that is to use a particular enhanced distribution channel access (EDCA) parameter set and a transmitter for transmitting the frame containing the TIM IE via the at least one antenna.

Certain aspects of the present disclosure provide a wireless station. The wireless station typically includes at least one antenna, a receiver for receiving, via the at least one antenna, a frame with indication of a type of device that is to use a particular enhanced distributed channel access (EDCA) parameter set and a processing system configured to determine whether the apparatus should use the particular EDCA parameter set based on the indication.

Certain aspects also provide various methods, apparatuses, and computer program products capable of performing operations corresponding to those described above.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 10A & 10B illustrate values for example default EDCA parameter sets, in accordance with certain aspects of the present disclosure.

DETAILED DESCRIPTION

Figure 1:
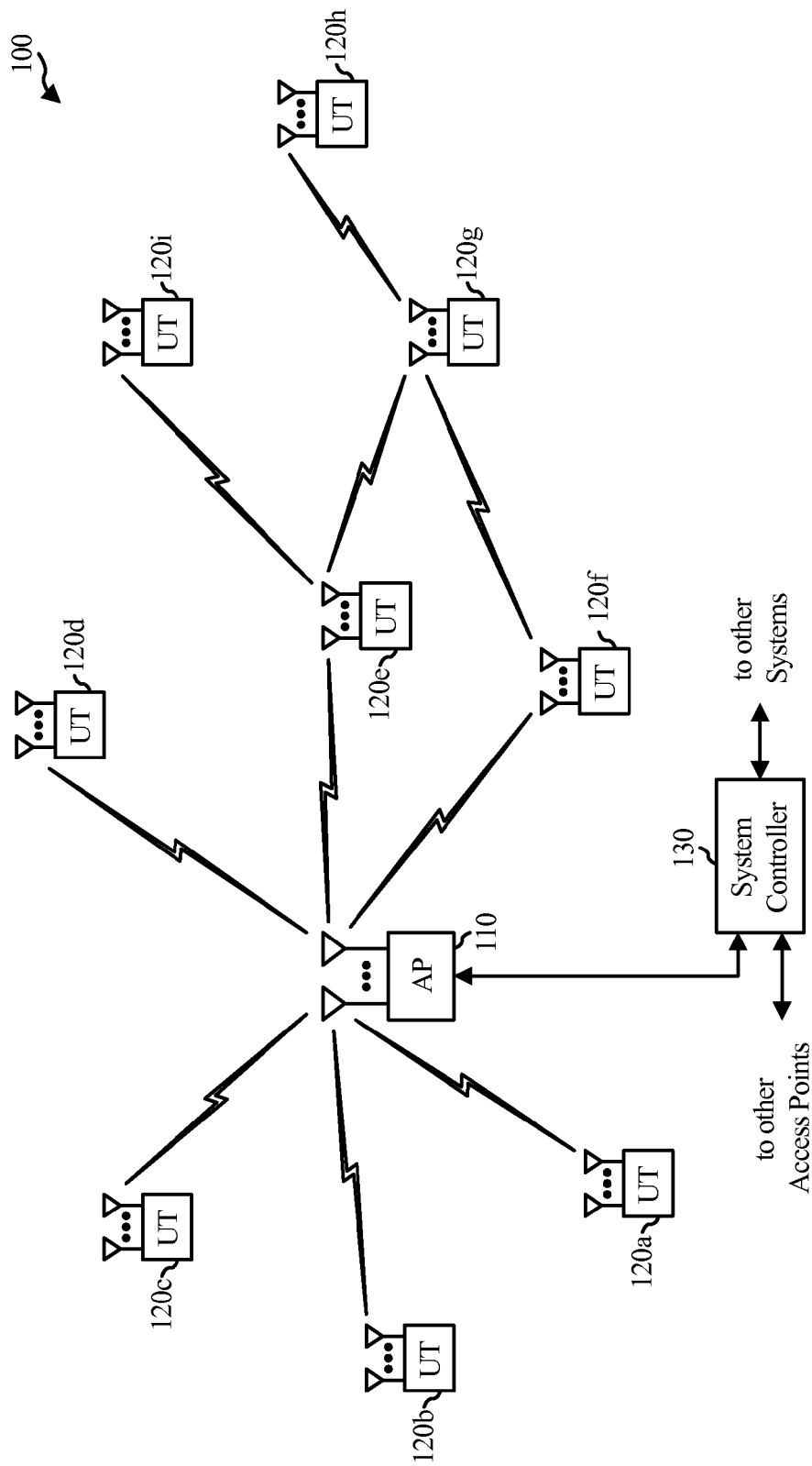
FIG. 1 illustrates a diagram of an example wireless communications network, in accordance with certain aspects of the present disclosure.

Aspects of the present disclosure provide enhancements to mechanisms involving certain selective transmission mechanisms, such as enhanced distributed channel access (EDCA) and support for device (e.g., station) types. By providing an indication of a type of station that should use a particular EDCA parameter set, different device types may be able to use different EDCA parameter sets, effectively allowing for different access priorities.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
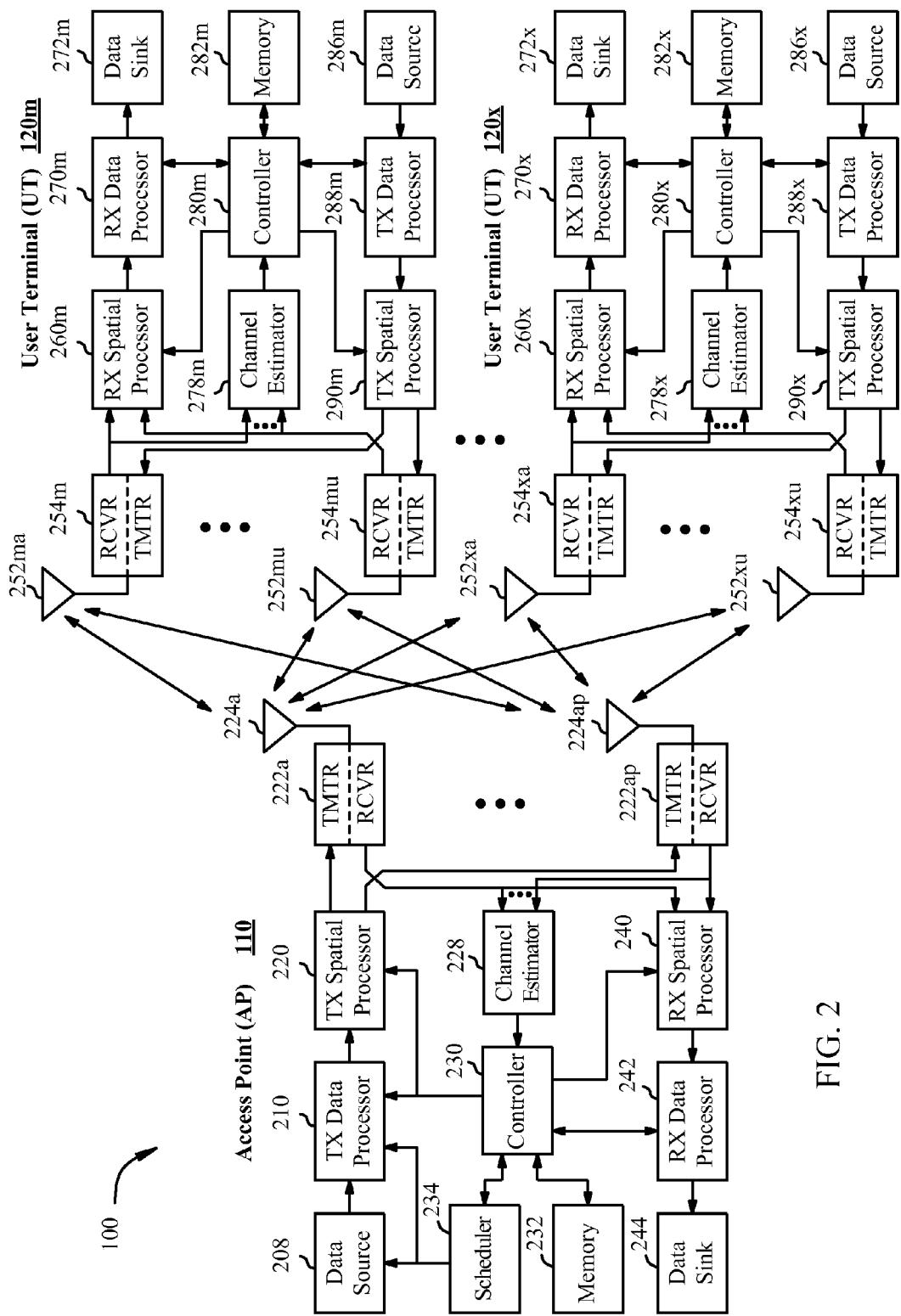
FIG. 2 illustrates a block diagram of an example access point and user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
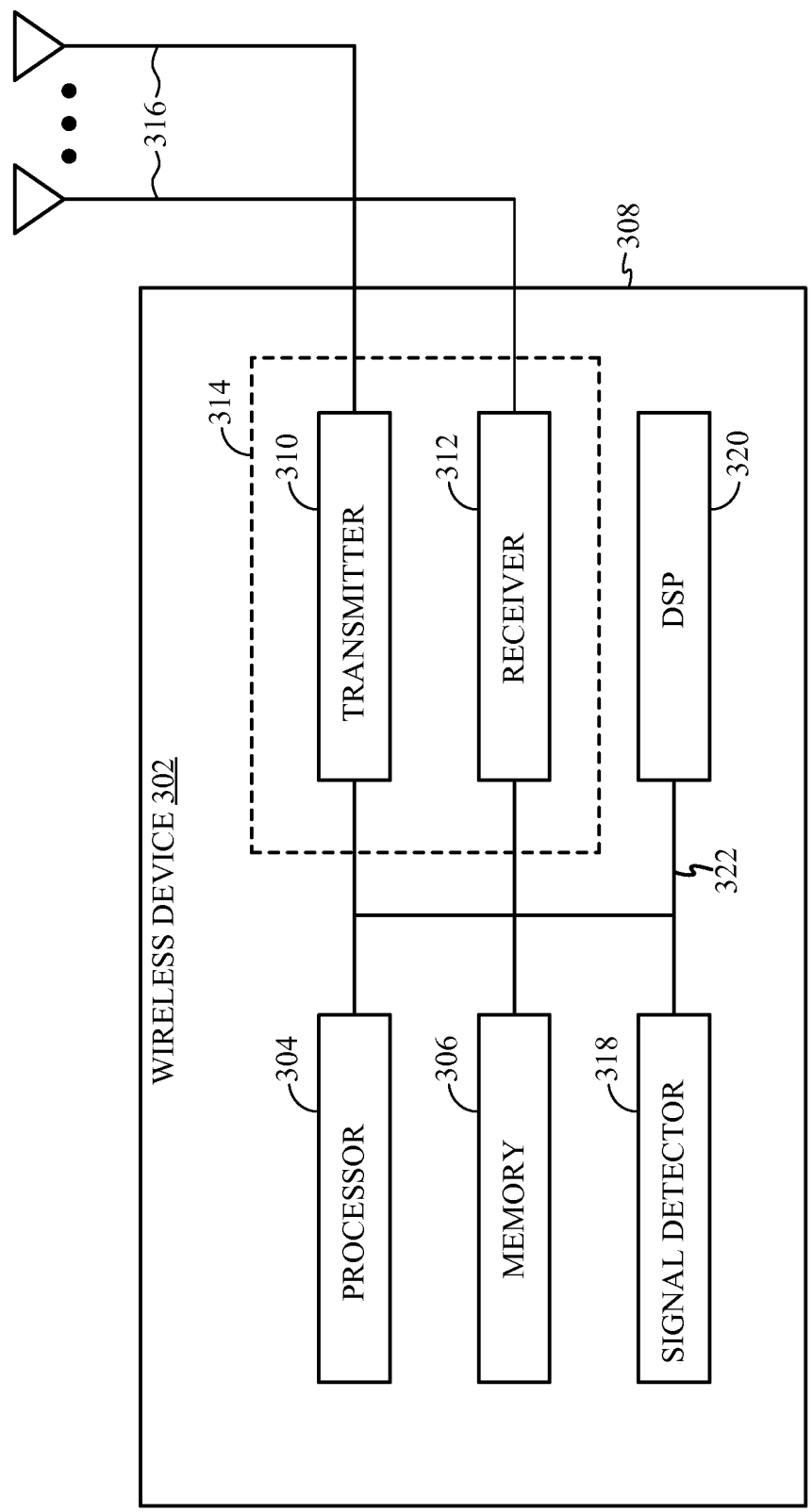
FIG. 3 illustrates a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Target Wait Time Flow ID Signaling

In a relay system utilizing low power devices as relays, it may be desirable to allow relays to enter a low power mode (e.g., sleep with one or more components powered down) whenever possible to reduce power consumption. Further, to keep costs down, it may be desirable to use relays with only limited memory. Thus, a relay may be able to buffer only a small amount of data, and may need to forward the data before being able to receive more.

Figure 4:
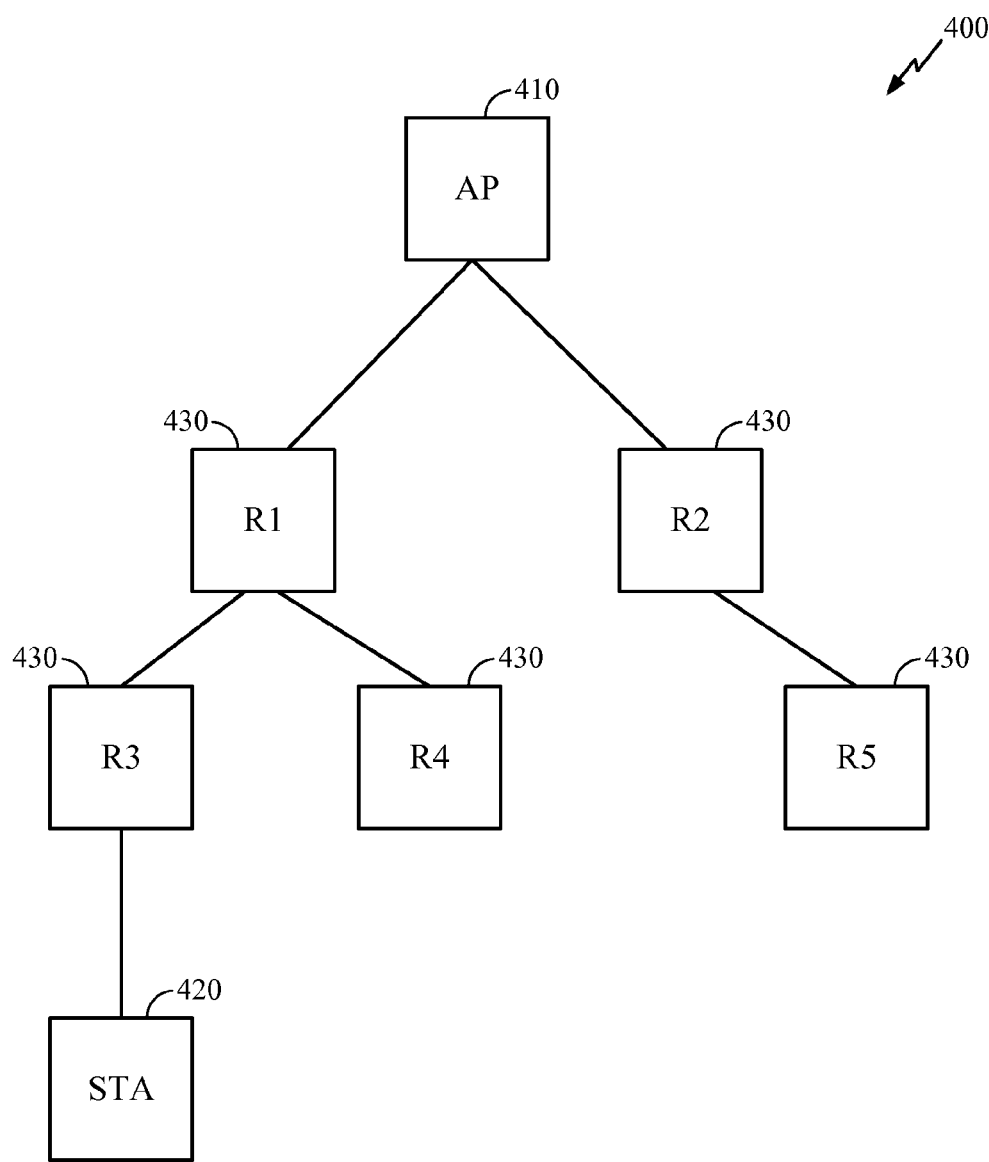
FIG. 4 illustrates an example tree structure of a relay system, in accordance with certain aspects of the present disclosure.

In a multi-hop relay system, such as that shown in FIG. 4, this may present some challenges on how to conserve power and still ensure devices are awake at appropriate times to relay data. In general, all relays 430 (R1-R5) between an AP 410 and a leaf STA 420 may need to be able to exit a low power state (awaken) quickly, in order to transmit (relay) data in small chunks.

Techniques presented herein may be considered part of a power savings protocol that achieves the above two goals, allowing devices to conserve power and operate with limited amount memory. According to certain aspects, various mechanisms already defined in certain standards (e.g., 802.11 ah), for use in direct communications between an AP and stations, may be modified and extended for use in relay systems.

In various systems, such as IEEE 802.11ah, there may be motivations to utilize relay devices 430 between access points (APs) 410 and stations 420. For example, the use of relays may be desirable because, even with a potential increased downlink (DL) range with 900 MHz (or other "sub-1 GHz) carrier, it may not be sufficient in applications with remote sensors or scenarios with obstructions in AP to STA path. On the uplink, a STA may have substantially lower transmit power than an AP, so the STA may not be able to reach the AP.

Key Characteristics of such systems may include the use of a multi-hop relay using a tree structure, as shown in FIG. 4. A relay-node may be formed by any suitable entity, such as a non-AP-STA (e.g., any station that lacks the ability to act—or is not currently acting—as an AP) that connects to a parent node or an AP-STA that allows association by child nodes. Node-to-node security may be ensured, for example, by the configuration of pre-shared key mode (PSK) between each pair of nodes. Relay nodes may support 4-address format with backward learning bridge. In some cases, automatic configuration and re-configuration may be achieved, for example, with a relay node able to attach to a better "parent node." A relay node may, thus, monitor the health of the link to a parent node.

As will be described in greater detail below, a relay node may also be configured to enter a low power state (e.g., a sleep mode with radio components powered down) in order to conserve battery power. In some cases, a relay node may be configured with scheduled wakeup periods, during which the relay node may transmit and receive data. To conserve power, however, rather than exit the low power state each wakeup period, a relay may decide to exit the low power state only when one or more conditions are met (e.g., when there has been an indication there is data for the relay node to transmit or receive).

As will be described in greater detail below, some stations may be sensor devices. Sensor and non-sensor stations may have different requirements and there may be benefit for providing different access parameters (via different EDCA parameter sets). Such sensor devices may be battery or powered wireless sensing devices. As sensor devices may be sensitive to power consumption, sensor devices may also be configured to enter a low power state in order to conserve batter power, thus it may be preferable to configure such devices with EDCA parameter sets that gives them priority over other types of devices (e.g., devices that are not as sensitive to power consumption. According to techniques presented herein, APs may be configured to support sensor only stations, non-sensor stations, and for both.

In general, an AP and STA may perform similar (e.g., symmetric or complementary) operations. Therefore, for many of the techniques described herein, an AP or STA may perform similar operations. To that end, the following description will sometimes refer to an "AP/STA" to reflect that an operation may be performed by either. Although, it should be understood that even if only "AP" or "STA" is used, it does not mean a corresponding operation or mechanism is limited to that type of device.

Example EDCA Parameter Set Differentiation for Different Device Types

In systems with many different applications and traffic, enhanced distributed channel access (EDCA) may be utilized to indicate what traffic should be handled at a higher or lower priority.

Figures 5A, 5B:
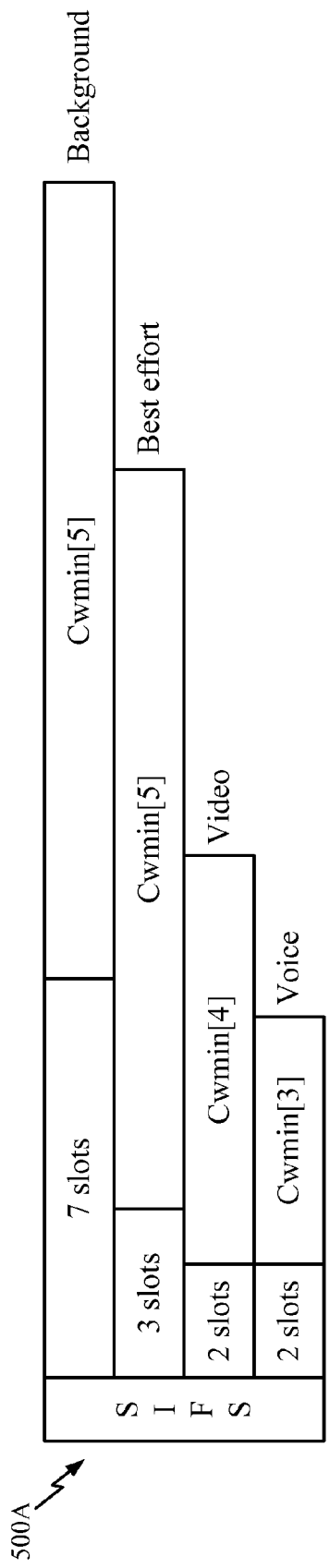
FIGS. 5A and 5B illustrates examples of an enhanced distributed channel access (EDCA) contention window, in accordance with certain aspects of the present disclosure.

FIG. 5A illustrates example 500A of enhanced distributed channel access (EDCA) contention windows, in accordance with certain aspects of the present disclosure. FIG. 5B illustrates values for an example EDCA parameter set, in accordance with certain aspects of the present disclosure.

In the illustrated examples, EDCA includes four access categories (ACs) including Background (AC_BK), Best Effort (AC_BE), Video (AC_VI) and Voice (AC_VO). Each AC is associated with a set of EDCA parameters. The EDCA parameter set define levels of priority, in terms of CWmin, CWmax and AIFSN parameters, that need to be used for accessing the medium under EDCA mechanism, and the amount of time that a frame exchange can last during the transmit opportunity that has started after gaining access to the medium while using these parameters. The levels of priority (that are specified by the AIFSN, CWmin, CWmax, and TXOPlimit parameters) can be set according to traffic expected in the various ACs.

Using EDCA, a device may contend for access to the medium for a particular time period. After a short interframe space (SIFS), a device may wait for a time period defined by the arbitration inter-frame space time (AIFSN) and then randomly select a value between the minimum contention window (CWmin) and the maximum contention window (CWmax) as a value for a backoff timer and waits. CWmin and CWmax may be calculated based on aCWmin and aCWmax respectively, which are defined for each physical layer supported.

For example, where a physical layer, such as one defined by 802.11g, defines an aCWmin as 15 and an aCWmax as 1023, where an AC, such as AC_BK, defines CWmin as aCWmin, then CWmin is set to 15. CWmax is similarly defined. Where an AC, such as AC_VI, defines CWmin as a function of aCWmin, such as (aCWmin+1)/2−1, then CWmin is set based on this function, here, 7. The backoff timer is decremented for each unused time slot that passes until it reaches zero and the device is allowed to access the medium.

Where multiple devices attempt to access the medium in the same slot, no acknowledgment of the transmitted frame will be received and the devices may backoff and try again. Each AC thus waits for a different amount of time before trying to access the medium, which shorter wait times correlating with higher priority traffic.

When the device is allowed to access the medium, the device may use the medium for a set time limit. EDCA includes a transmit opportunity (TXOP) which defines the time frame the device has for contention free access to the medium. A TXOP is bound by a TXOP limit parameter, which represents the total time interval for transmission by the device. A TXOP limit of 0 may allow for only a single MAC service data unit (MSDU) or MAC management protocol data unit (MMPDU) transmission. Higher priority traffic may include longer TXOP limits.

Figure 6:
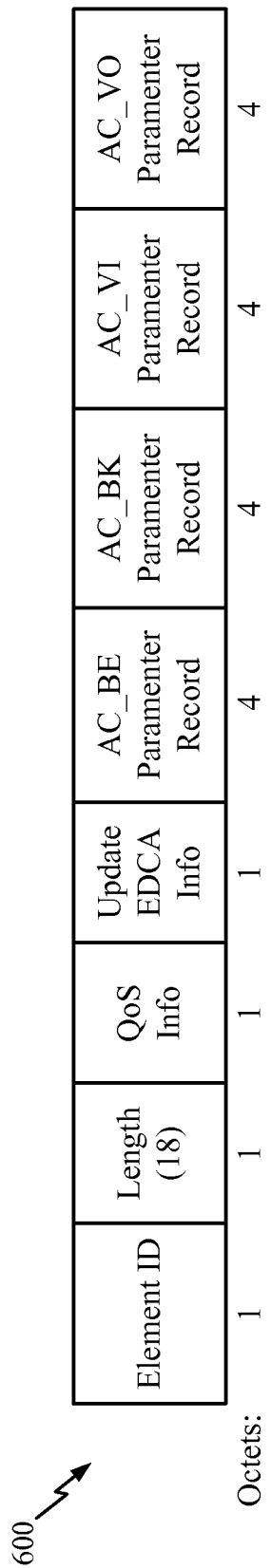
FIG. 6 illustrates an example structure for an EDCA Parameter Set element, in accordance with certain aspects of the present disclosure.
Figure 7:
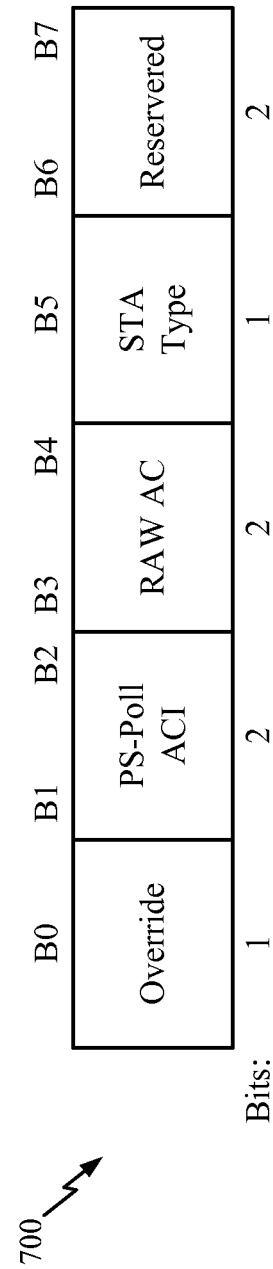
FIG. 7 illustrates an example structure of an EDCA Information field, in accordance with certain aspects of the present disclosure.

FIG. 6 illustrates an example 600 structure of an enhanced distributed channel access (EDCA) parameter set, in accordance with certain aspects of the present disclosure. As illustrated, the structure 600 may include an element ID, length, QoS information, update EDCA information, best effort parameter record (AC_BE), background parameter record (AC_BK), video parameter record (AC_VI) and voice parameter record (AC_VO). An example structure 600 for an Update EDCA information element subfield that allows sensor type differentiation, in accordance with aspects of the present disclosure is shown in FIG. 7.

As noted above, an EDCA parameter set allows signaling to enable prioritization of various types of traffic. However, certain designs of EDCA parameter set signaling does not allow for signaling to explicitly differentiate between different types of devices (e.g., non-sensor stations and sensor stations). As discussed above, an AP may declare support for sensor only stations, for non-sensor stations, and for both. If a higher priority is needed for a given type of station, group filtering of the EDCA parameter set may be used, which may require additional signaling and, hence, additional power.

Aspects of the present disclosure, however, may provide signaling mechanisms to enable an AP to differentiate between different device types when assigning EDCA parameter set to differentiate between station types by providing an indication of which device type (e.g., sensor or non-sensor stations) the values in the EDCA parameter apply to.

Figure 8:
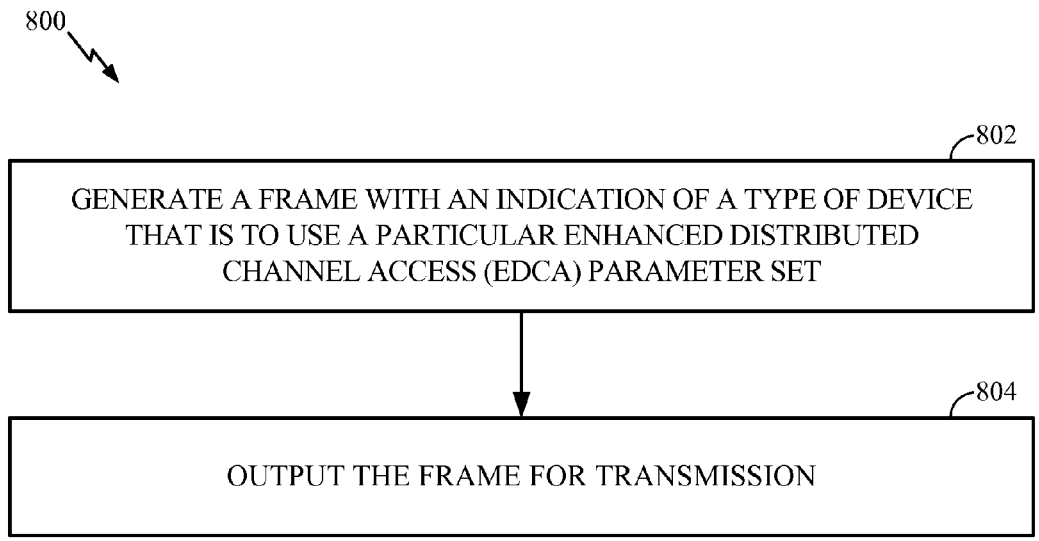
FIG. 8 illustrates a block diagram of example operations for wireless communications, in accordance with certain aspects of the present disclosure.

FIG. 8 illustrates example operations 800 for wireless communications by an apparatus, in accordance with aspects of the present disclosure. The operations 800 may be performed by an apparatus, such as a station, acting as an access point.

Operations 800 may begin at 802, by generating a frame with an indication of a type of device that should use a particular enhanced distributed channel access (EDCA) parameter set. At 804, the apparatus outputs the frame for transmission.

Figure 9:
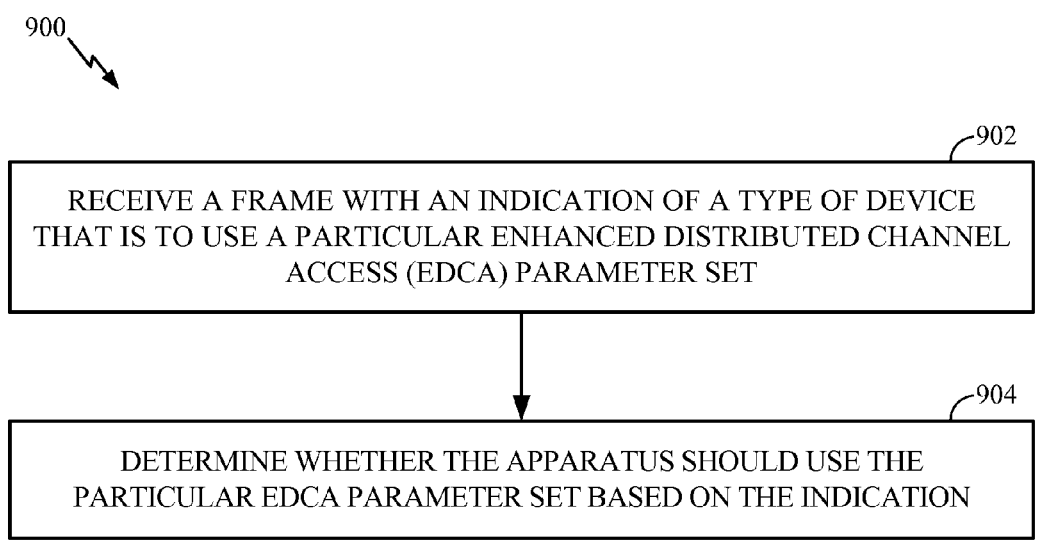
FIG. 9 illustrates a block diagram of example operations for wireless communications, in accordance with certain aspects of the present disclosure.

FIG. 9 is a block diagram of operations 900 for wireless communications by an apparatus, in accordance with aspects of the present disclosure. The operations 900 may be performed by an apparatus, such as a sensor or non-sensor type station.

Operations 900 may begin at 902, by receiving a frame with an indication of a type of device that should use a particular enhanced distributed channel access (EDCA) parameter set. At 904, the apparatus determines whether the apparatus should use the particular EDCA parameter set based on the indication.

According to certain aspects, the indication may comprise a value that identifies a type of device, from a group of different device types that comprises at least one sensor type and at least one non-sensor type. In some cases, the indication may be provided in an EDCA parameter set element, for example, as a device type subfield in an Update EDCA Info field in the EDCA parameter set element. Such a device type subfield may be set to a first value to indicate information provided by the EDCA parameter set element is valid for sensor type devices, or the device type subfield may be set to a second value to indicate information provided by the EDCA parameter set element is valid for non-sensor type devices.

For example, referring to FIG. 7, a 1-bit Station (STA) Type subfield that is included in the Update EDCA Info subfield may be used to provide the indication. The STA Type field may be set to 0 to indicate that the information provided by this element is valid for Sensor type STAs. Otherwise, it may be set to 1 to indicate that the information is valid for non-Sensor type STAs.

In some cases, the Type subfield may not be limited to just two values. For example, the Type subfield may be set a third value to indicate information provided by the EDCA parameter set is valid for both (e.g., Sensor and non-Sensor) types of devices. Generally, the Type subfield may be set to a value to indicate information provided by the EDCA parameter set is valid for more than one type of device.

According to certain aspects, an AP may belong to a basic service set (BSS) that supports at least first and second types of devices. The AP may generate a first frame with a first EDCA parameter set element having an indication of the first type of device and a second frame with a second EDCA parameter set element having an indication of the second type of device. In some cases, an AP may generate an additional frame containing a default EDCA parameter set for use by a type of device that does not receive a frame with an indication that type of device should use a particular EDCA parameter set. Thus, a station may use the default EDCA parameter set in case it does not receive an explicit indication that its corresponding sensor type should use a particular parameter set. FIG. 10A illustrates values for an example default EDCA parameter set, for example, that may be used for one type of station (e.g., for STA type=1). FIG. 10B illustrates values for another example default EDCA parameter set, for example, that may be used for another type of station (e.g., for STA type=0). In general, for most systems, TXOP limit values may have any value between 0 and 28 ms. A STA may receive the Update EDCA Info field, check the STA Type subfield, and based on the STA type, determine whether the particular set of EDCA parameters apply to the STA.

Using techniques presented herein, a station (e.g., an S1G station) may update its master information block (MIB) values only if the received EDCA parameter set in the EDCA Parameter Set element corresponds to its STA Type (e.g., as a Sensor or non-sensor station).

An AP that indicates support for STAs that are of a certain type, for example, sensor type STAs may set the STA Type subfield in EDCA Parameter Set elements it transmits to 0, while if it indicates support for Non-Sensor type STAs then it may set the STA Type subfield in EDCA Parameter Set elements it transmits to 1. If the AP indicates support for both types of STAs, i.e., both Sensor type and non-Sensor type STAs then the AP announces EDCA parameters as described above for each type and to do so it may include two EDCA Parameter Set elements, one with the STA Type subfield equal to 0 (e.g., for sensor STAs) and one with the STA Type subfield equal to 1 (e.g., for non-sensor STAs).

Figure 8A:
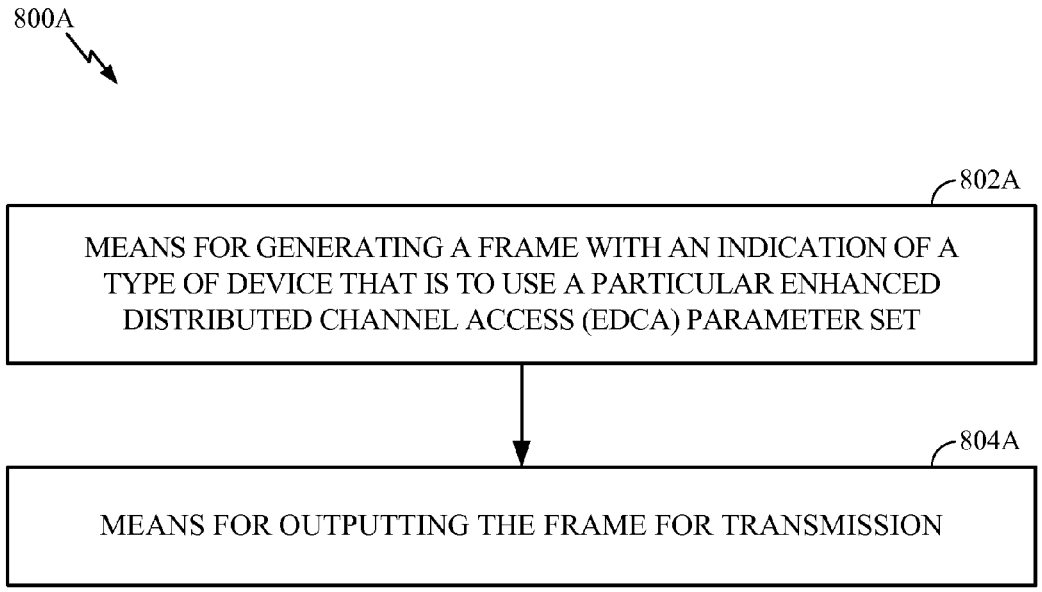
FIG. 8A illustrates example means capable of performing the operations shown in FIG. 8.
Figure 9A:
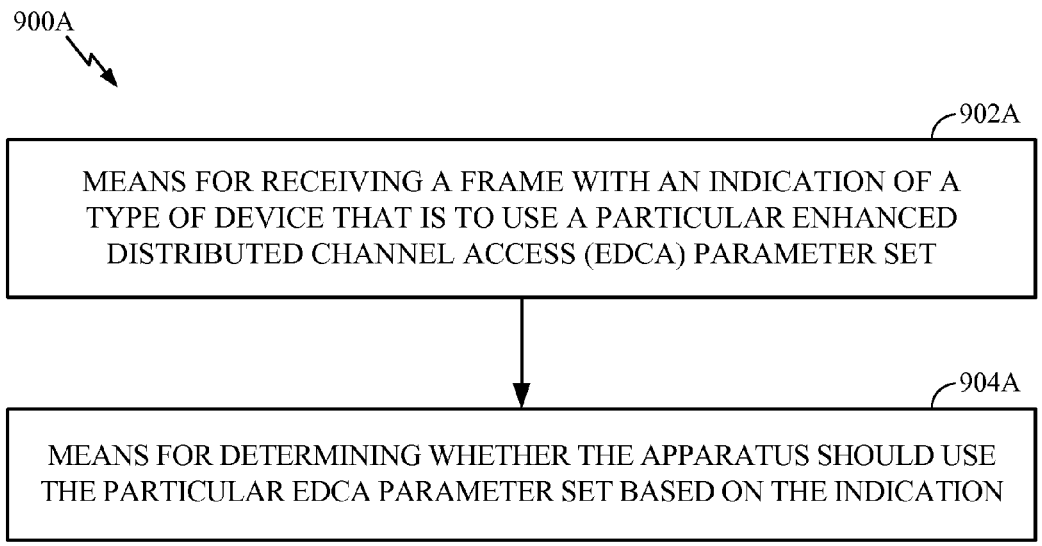
FIG. 9A illustrates example means capable of performing the operations shown in FIG. 9.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 700 and 800 illustrated in FIGS. 7 and 8 correspond to means 700A and 800A illustrated in FIGS. 7A and 8A, respectively.

For example, means for transmitting may comprise a transmitter (e.g., the transmitter unit 222) and/or an antenna(s) 224 of the access point 110 illustrated in FIG. 2 or the transmitter 310 and/or antenna(s) 316 depicted in FIG. 3. Means for receiving may comprise a receiver (e.g., the receiver unit 222) and/or an antenna(s) 224 of the access point 110 illustrated in FIG. 2 or the receiver 312 and/or antenna(s) 316 depicted in FIG. 3. Means for processing, means for determining, means for detecting, means for scanning, means for selecting, means for generating, means for outputting, or means for terminating operation may comprise a processing system, which may include one or more processors, such as the RX data processor 242, the TX data processor 210, and/or the controller 230 of the access point 110 illustrated in FIG. 2 or the processor 304 and/or the DSP 320 portrayed in FIG. 3.

According to certain aspects, such means may be implemented by processing systems configured to perform the corresponding functions by implementing various algorithms (e.g., in hardware or by executing software instructions) described above for performing fast association. For example, means for generating a frame may be implemented by a processing system performing an algorithm that generates a frame with an indication of a type of device that is to use a particular enhanced distributed channel access (EDCA) parameter set, and means for outputting a frame for transmission may be implemented by a (same or different) processing system performing an algorithm that takes, as input, the generated frame and generates signals to enable/disable the radio functions accordingly.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the term receiver may refer to an RF receiver (e.g., of an RF front end) or an interface (e.g., of a processor) for receiving structures processed by an RF front end (e.g., via a bus). Similarly, the term transmitter may refer to an RF transmitter of an RF front end or an interface (e.g., of a processor) for outputting structures to an RF front end for transmission (e.g., via a bus).

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node.

The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
a processing system configured to generate a frame with an enhanced distributed channel access (EDCA) parameter set element comprising an Update EDCA Info field comprising a device type subfield indicating a type of device that is to use a particular EDCA parameter set, wherein the device type subfield comprises a value that identifies the type of device, from a group of different device types supporting EDCA comprising at least a sensor type device and a non-sensor type device; and
an interface for outputting the frame for transmission.

2. The apparatus of claim 1, wherein:
the device type subfield is set to a first value to indicate information provided by the EDCA parameter set element is valid for sensor type devices; or
the device type subfield is set to a second value different from the first value to indicate information provided by the EDCA parameter set element is valid for non-sensor type devices.

3. The apparatus of claim 1, wherein:
the device type subfield is set to a value that indicates information provided by the EDCA parameter set element is valid for both sensor and non-sensor types of devices.

4. The apparatus of claim 1, wherein:
the device type subfield is set to a value that indicates information provided by the EDCA parameter set element is valid for more than one type of device.

5. The apparatus of claim 1, wherein:
the apparatus belongs to a basic service set (BSS) that supports at least one or more of a first type of device and a second type of device;
the processing system is configured to:
generate the frame with a first EDCA parameter set element comprising an Update EDCA Info field comprising a device type subfield indicating the first type of devices; and
generate an additional frame with a second EDCA parameter set element comprising an Update EDCA Info field comprising a device type subfield indicating the second type of device; and
the interface is also for outputting the additional frame for transmission.

6. The apparatus of claim 1, wherein:
the processing system is configured to use a default EDCA parameter set for contending to access a wireless medium.

7. The apparatus of claim 1, further comprising a transmitter configured to transmit the frame, wherein the apparatus is configured as a wireless node.

8. An apparatus for wireless communications, comprising:
   an interface for receiving a frame with an enhanced distributed channel access (EDCA) parameter set element comprising an Update EDCA Info field comprising a device type subfield indicating a type of device that is to use a particular EDCA parameter set, wherein the device type subfield comprises a value that identifies the type of device, from a group of different device types supporting EDCA comprising at least a sensor type device and a non-sensor type device; and
   a processing system configured to
      update EDCA information, for the apparatus, using the particular EDCA parameter set if the apparatus is the type of device indicated by the device type subfield.

9. The apparatus of claim 8, wherein:
   the apparatus is a sensor type device and the processing system is configured to update the EDCA information for the apparatus using the particular EDCA parameter set if the device type subfield is set to a first value that indicates information provided by the EDCA parameter set element is valid for sensor type devices; or
   the apparatus is a non-sensor type device and the processing system is configured to update the EDCA information for the apparatus using the particular EDCA parameter set if the device type subfield is set to a second value different from the first value that indicates information provided by the EDCA parameter set element is valid for non-sensor type devices.

10. The apparatus of claim 8, wherein the processing system is configured to update the EDCA information for the apparatus using the particular EDCA parameter set if the device type subfield is set to a value that indicates information provided by the EDCA parameter set element is valid for both sensor and non-sensor types of devices.

11. The apparatus of claim 8, wherein the processing system is configured to update the EDCA information for the apparatus using the particular EDCA parameter set if the device type subfield is set to a value that indicates information provided by the EDCA parameter set element is valid for more than one type of device.

12. The apparatus of claim 8, wherein the processing system is further configured to use a default EDCA parameter set different from the particular EDCA parameter set if a frame with an indication of a device type corresponding to the apparatus is not received.

13. The apparatus of claim 8, further comprising a receiver configured to receive the frame, wherein the apparatus is configured as a station.

14. A method for wireless communications by an apparatus, comprising:
   generating, at the apparatus, a frame with an enhanced distributed channel access (EDCA) parameter set element comprising an Update EDCA Info field comprising a device type subfield indicating a type of device that is to use a particular EDCA parameter set, wherein the device type subfield comprises a value that identifies the type of device, from a group of different device types supporting EDCA comprising at least a sensor type device and a non-sensor type device; and
   outputting the frame for transmission.

15. The method of claim 14, wherein:
   the device type subfield is set to a first value to indicate information provided by the EDCA parameter set element is valid for sensor type devices; or
   the device type subfield is set to a second value different from the first value to indicate information provided by the EDCA parameter set element is valid for non-sensor type devices.

16. The method of claim 14, wherein:
   the device type subfield is set to a value that indicates information provided by the EDCA parameter set element is valid for both sensor and non-sensor types of devices.

17. The method of claim 14, wherein:
   the device type subfield is set to a value that indicates information provided by the EDCA parameter set element is valid for more than one type of device.

18. The method of claim 14, wherein the apparatus belongs to a basic service set (BSS) that supports at least one or more of a first type of device and a second type of device and the method further comprises:
   generating the frame with a first EDCA parameter set element comprising an Update EDCA Info field comprising a device type subfield indicating the first type of device and an additional frame with a second EDCA parameter set element comprising an Update EDCA Info field comprising a device type subfield indicating the second type of device; and
   outputting the additional frame for transmission.

19. The method of claim 14, further comprising:
   using a default EDCA parameter set for contending to access a wireless medium.

20. A method for wireless communications by an apparatus, comprising:
   receiving, at the apparatus, a frame with an enhanced distributed channel access (EDCA) parameter set element comprising an Update EDCA Info field comprising a device type subfield indicating a type of device that is to use a particular EDCA parameter set, wherein the device type subfield comprises a value that identifies the type of device, from a group of different device types supporting EDCA comprising a sensor type device and a non-sensor type device; and
   updating EDCA information, for the apparatus, using the particular EDCA parameter set if the apparatus is the type of device indicated by the device type subfield.

21. The method of claim 20, wherein the updating comprises:
   updating the EDCA information for the apparatus using the particular EDCA parameter set if the device type subfield is set to a first value that indicates information provided by the EDCA parameter set element is valid for sensor type devices and the apparatus is a sensor type device; or
   updating the EDCA information for the apparatus using the particular EDCA parameter set if the device type subfield is set to a second value different from the first value that indicates information provided by the EDCA parameter set element is valid for non-sensor type devices and the apparatus is a non-sensor type device.

22. The method of claim 20, wherein the updating comprises:
   updating the EDCA information for the apparatus using the particular EDCA parameter set if the device type subfield is set to a value that indicates information provided by the EDCA parameter set element is valid for both sensor and non-sensor types of devices.

23. The method of claim 20, wherein the updating comprises:
  updating the EDCA information for the apparatus using the particular EDCA parameter set if the device type subfield is set to a value that indicates information provided by the EDCA parameter set element is valid for more than one type of device.

24. The method of claim 20, further comprising:
  using a default EDCA parameter set different from the particular EDCA parameter set if a frame with an indication of a device type corresponding to the apparatus is not received.

* * * * *